United States Patent
Jensen et al.

(10) Patent No.: US 9,522,584 B2
(45) Date of Patent: Dec. 20, 2016

(54) VEHICLE ENERGY MANAGEMENT SYSTEM WITH TETHER FOR TIRE AND WHEEL ASSEMBLY

(71) Applicant: GM GLOBAL TECHNOLOGY OPERATIONS LLC, Detroit, MI (US)

(72) Inventors: Charles E. Jensen, Shelby Township, MI (US); Robert N. Saje, Shelby Township, MI (US); Jonathan E. Rich, Clinton Township, MI (US); Michael E. Quigley, Washington Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/714,870

(22) Filed: May 18, 2015

(65) Prior Publication Data

US 2016/0339752 A1 Nov. 24, 2016

(51) Int. Cl.
*B60G 3/04* (2006.01)
*B60B 9/14* (2006.01)
*B60G 11/18* (2006.01)

(52) U.S. Cl.
CPC . *B60G 3/04* (2013.01); *B60B 9/14* (2013.01); *B60B 2340/50* (2013.01); *B60G 11/182* (2013.01); *B60G 2200/4622* (2013.01)

(58) Field of Classification Search
CPC combination set(s) only.
See application file for complete search history.

(56) References Cited

U.S. PATENT DOCUMENTS

2013/0328334 A1* 12/2013 Hoiss ............... B60R 19/24 293/154
2015/0210315 A1* 7/2015 Maier ............... B62D 9/00 180/280

* cited by examiner

*Primary Examiner* — Nicole Verley
(74) *Attorney, Agent, or Firm* — Quinn Law Group, PLLC

(57) ABSTRACT

An energy management system for a vehicle limits movement of a tire and wheel assembly in a wheel cavity. The vehicle has a wheel well structure that defines the wheel cavity. The energy management system includes a tether attached to the tire and wheel assembly. The tether is configured to limit movement of the tire and wheel assembly within the wheel cavity under a predetermined load that is applied to the vehicle forward of the tire and wheel assembly and offset from a longitudinal centerline of the vehicle.

20 Claims, 3 Drawing Sheets

VEHICLE ENERGY MANAGEMENT SYSTEM WITH TETHER FOR TIRE AND WHEEL ASSEMBLY

TECHNICAL FIELD

The present teachings generally include a vehicle energy management system positioned in a wheel cavity.

BACKGROUND

Vehicles are often equipped with various components configured to manage the energy of an applied force. For example, a bumper may be attached to frame rails to manage energy applied to the bumper.

SUMMARY

An energy management system for a vehicle is configured to limit movement of a tire and wheel assembly in a wheel cavity under a predetermined load offset from a longitudinal centerline of the vehicle. More specifically, the vehicle has a wheel well structure that defines the wheel cavity. The energy management system includes a tether attached to the tire and wheel assembly. The tether is configured to limit movement of the tire and wheel assembly within the wheel cavity under a predetermined load that is applied to the vehicle forward of the tire and wheel assembly and offset from a longitudinal centerline of the vehicle.

In one embodiment, the tether is attached to a lower control arm of the vehicle that is operatively connected to the wheel, and is also attached to a steering knuckle of the vehicle. The steering knuckle may have a first opening and the lower control arm may have a boss with a second opening. The tether is operatively connected to the steering knuckle at the first opening and to the lower control arm at the second opening.

In another embodiment, the tether is attached to an engine cradle of the vehicle and to the steering knuckle. For example, the steering knuckle has a first opening and the engine cradle has a boss with a second opening. The tether has a first end operatively connected to the steering knuckle at the first opening and a second end operatively connected to the engine cradle at the second opening The tether may include a cable portion, a first end connector connected to a first end of the cable portion, and a second end connector connected to a second end of the cable portion. The first end connector may have a first lug configured to align with the first opening in the steering knuckle, and the second end connector has a second lug configured to align with the second opening in the lower control arm in one embodiment, or in the engine cradle in another embodiment.

The above features and advantages and other features and advantages of the present teachings are readily apparent from the following detailed description of the best modes for carrying out the present teachings when taken in connection with the accompanying drawings.

DETAILED DESCRIPTION

Figure 1:
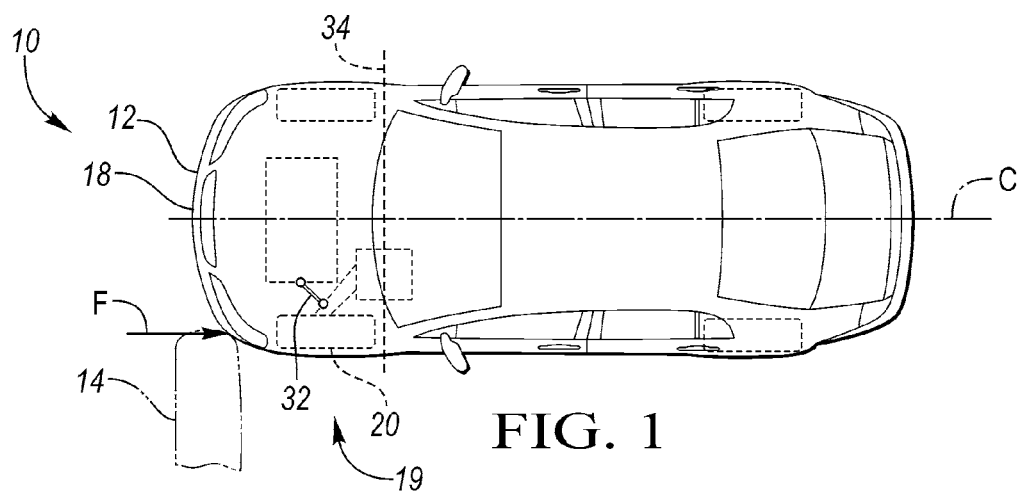
FIG. 1 is a schematic illustration in top view of a vehicle with a barrier shown in fragmentary phantom view contacting the vehicle at an offset from the center longitudinal axis of the vehicle.

Referring to the drawings, wherein like reference numbers refer to like components throughout the several views, FIG. 1 shows a vehicle 10 that has a longitudinal center axis C. A front end 12 of the vehicle 10 is shown at a moment when initially contacted by a barrier 14 that is laterally offset from the longitudinal center axis C. Because the barrier 14 is offset from the longitudinal center axis, a rearward-directed load F of the barrier 14, represented by a rearward arrow, is generally outboard of a longitudinally-extending frame rail 16 shown in the bottom view of FIG. 2, and initially engages only an outboard portion of a bumper 18 supported on the frame rail 16. An engine cradle 17 is supported on the frame rail 16 and supports an engine (not shown). The rearward-directed load F is also generally outboard of the engine cradle 17. As used herein, the term "outboard" refers to a position of a component further from the center of the vehicle 10 than an inboard position. A component is laterally-outboard relative to another component if it is further laterally from the longitudinal center axis C.

Figure 2:
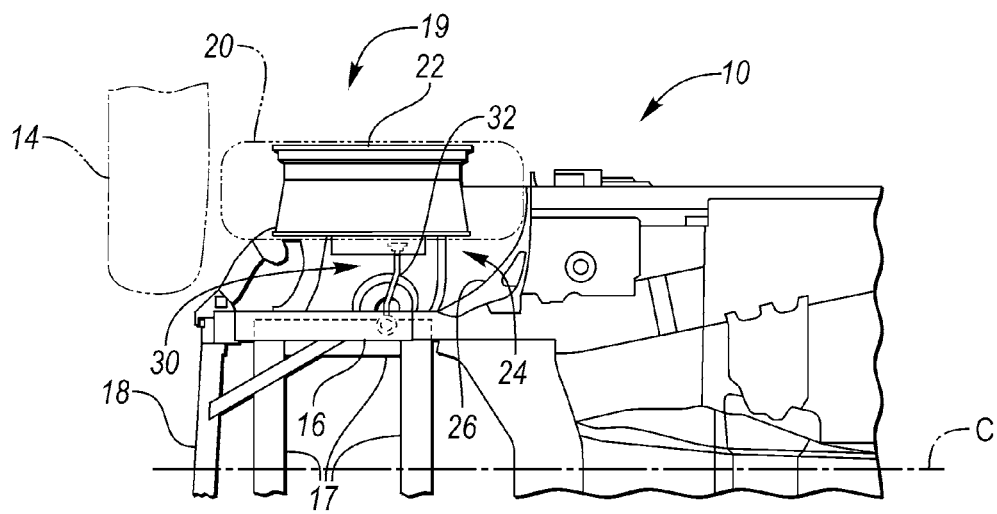
FIG. 2 is a schematic illustration in fragmentary bottom view of the vehicle and barrier of FIG. 1 and showing a first embodiment of an energy management system with a tether in a wheel cavity.

In FIG. 2, a fascia and body structure of the vehicle 10 are removed, and the barrier 14 is shown just prior to contacting the vehicle 10. As is apparent in FIGS. 1 and 2, a tire and wheel assembly 19 is in a direct path of the barrier 14. The tire and wheel assembly 19 includes a tire 20 shown only in phantom, a wheel 22 on which the tire 20 is mounted, a steering knuckle 23 connected to the wheel, and a caliper and rotor assembly (not shown) operatively connected to the wheel 22 as is understood by those skilled in the art.

The tire and wheel assembly 19 is positioned in a wheel cavity 24 formed and defined by wheel well structure 26 of the vehicle 10, as best shown in FIG. 2. The wheel well structure 26 may include various interconnected body components of the vehicle 10, as is understood by those skilled in the art. The wheel well structure 26 may also be referred to as wheelhouse structure.

Figure 3:
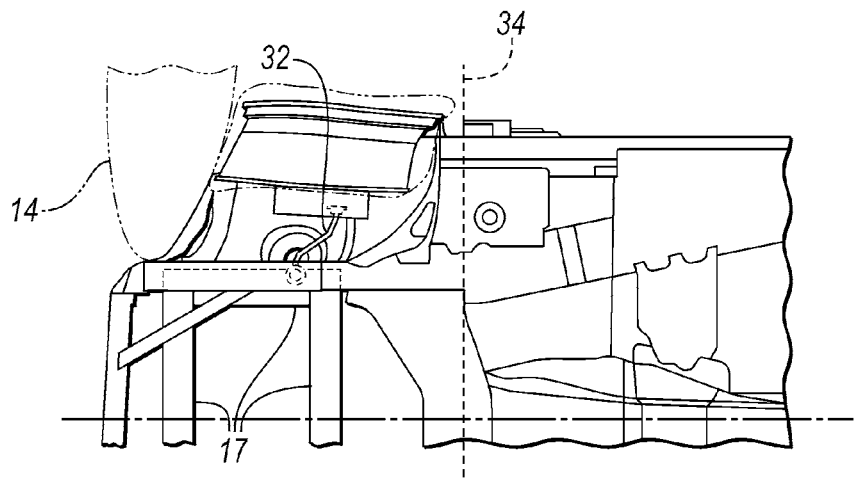
FIG. 3 is a schematic illustration in fragmentary bottom view of the vehicle of FIG. 2 with the tether limiting movement of the tire and wheel assembly when the barrier engages the vehicle.

In order to limit movement of the tire and wheel assembly 19 in the wheel cavity 24 under loading by load F, the vehicle 10 has an energy management system 30 operatively positioned in the wheel cavity 24. The energy management system 30 is configured to limit movement of the tire and wheel assembly 19 in the wheel cavity 24. For example, the energy management system 30 may limit movement of the tire and wheel assembly 19 rearward of the wheel well structure 26 under a predetermined load F, such as a load F having a magnitude of 350 kilonewtons (kN) to 400 kN. For example, the energy management system 30 limits or prevents movement of the tire and wheel assembly 19 rearward of line 34 shown in FIGS. 1 and 3. Line 34 is generally perpendicular to the longitudinal center axis C and may represent a forward portion of body structure, such as including wheel well structure 26 shown in FIG. 2, that extends generally across a width of the vehicle 10 and may establish a forward boundary of a passenger compartment. For example, line 34 can be referred to as a dash panel, or a panel that separates a front compartment, such as an engine compartment, from a passenger compartment.

Figure 4:
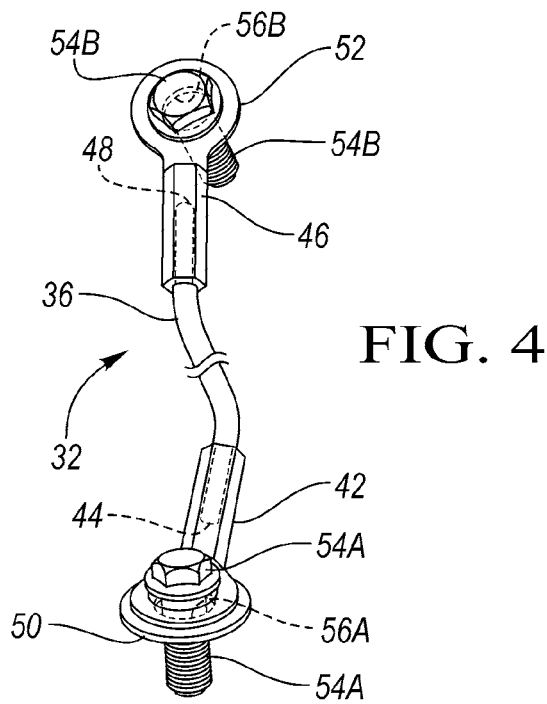
FIG. 4 is a schematic illustration of the tether of FIGS. 2 and 3.

In the embodiment of FIGS. 1-3, 5, and 7-8, the energy management system 30 includes a tether 32 attached to the tire and wheel assembly 19. More specifically, the tether 32 is attached to the steering knuckle 23 and the engine cradle 17. FIG. 4 shows the tether 32 includes a high strength cable portion 36 that may be a stranded wire covered by a plastic coating. The tether 32 further includes a first end connector 42 connected to a first end 44 of the cable portion 36. For example, the first end connector 42 can be crimped to the cable portion 36 at the first end 44. The tether 32 has a second end connector 46 connected to a second end 48 of the cable portion 36. For example, the second end connector 46 can be crimped to the cable portion 36 at the second end 48. The first end connector 42 has a first lug 50 and the second end connector 46 has a second lug 52. Bolts 54A, 54B with threaded shafts extend through openings 56A, 56B in the respective lugs 50, 52.

Figure 5:
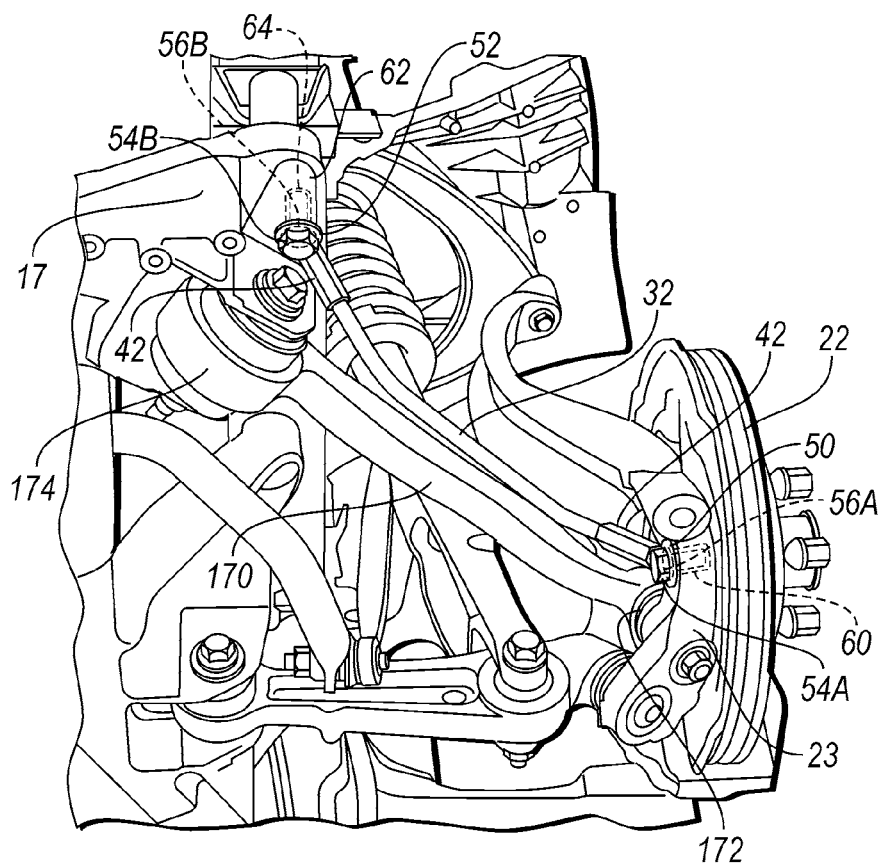
FIG. 5 is a schematic illustration in fragmentary perspective view of a portion of the vehicle of FIG. 1 showing the energy management system with the tether attached to an engine cradle and to a steering knuckle.

As best shown in FIG. 5, the first end connector 42 attaches to the steering knuckle 23 by the bolt 54A. The steering knuckle 23 has a first opening 60. In the embodiment shown, the steering knuckle 23 is a cast Aluminum alloy, but is not limited to such, the first opening 60 is drilled, and threads are tapped in the steering knuckle 23. The opening 56A of the first lug 50 aligns with the first opening 60. The bolt 54A extends through the opening 56A in the first lug 50 and into the first opening 60 to attach the tether 32 to the steering knuckle 23 at the first opening 60.

Figure 7:
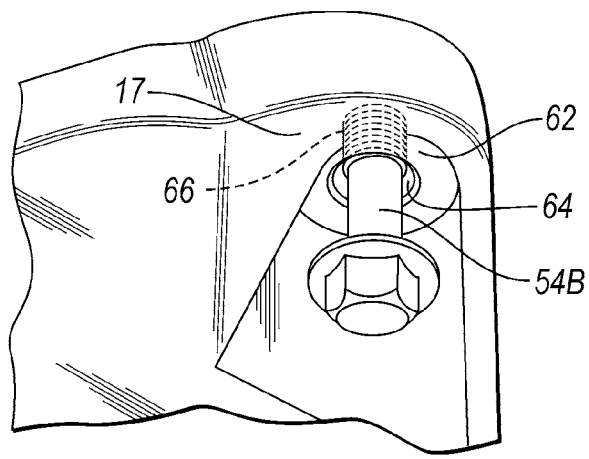
FIG. 7 is a schematic illustration in fragmentary perspective view of a portion of a boss of an engine cradle of FIG. 5 with a bolt extending in an opening of the boss.

With reference to FIG. 7, the engine cradle 17 has a boss 62 with an opening 64 referred to herein as a second opening. In the embodiment shown, the engine cradle 17 is an Aluminum alloy that is cast, such as a forged casting, or is a stamped steel, and the boss 62 can be formed integrally with the engine cradle 17. The second opening 64 is drilled, and threads 66 are tapped in the boss 62. In FIG. 7, the bolt 54B is shown extending into the opening 64. The lug 52 of the tether 32 is not shown in FIG. 7, but would be attached to the engine cradle 17 by the bolt 54B, as shown in FIG. 5. More specifically, the bolt 54B extends through the opening 56B in the second lug 52 and into the second opening 64 of the engine cradle 17 to attach the tether 32 to the engine cradle 17 at the second opening 64.

Figure 6:
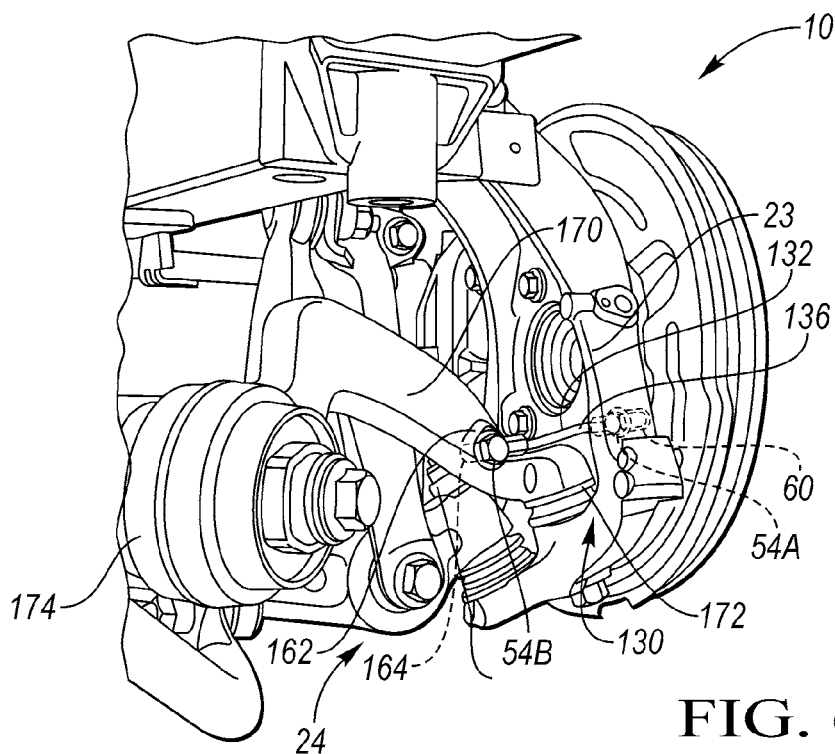
FIG. 6 is a schematic illustration in fragmentary perspective view of a portion of the vehicle of FIG. 1 with an alternative embodiment of an energy management system with a tether attached to a lower control arm and to the steering knuckle.

FIG. 6 shows the vehicle 10 with a different embodiment of an energy management system 130 that includes a tether 132. The engine cradle 17 is not shown in FIG. 6. The vehicle 10 includes a lower control arm 170 that is part of a vehicle steering system, as is understood by those skilled in the art. The lower control arm 170 is attached to the steering knuckle 23 at a first joint 172, and is attached to the engine cradle 17 (not shown in FIG. 6) at a second joint 174 (as shown in FIG. 5). The tether 132 is alike in all aspects to the tether 32 described with respect to FIG. 4, except the cable portion 36 is replaced with a much shorter cable portion 136, as the tether 132 is attached to the lower control arm 170 instead of the engine cradle 17. The tether 132 includes the same first and second connector portions 42, 46 with respective lugs 50, 52 having respective openings 56A, 56B for bolts 54A, 54B. The tether 132 is attached at a second opening 164 in the lower control arm 170 that is much closer to the first opening 60 of the steering knuckle 23 than is the second opening 64 of the engine cradle 17 in the embodiment of FIG. 4. Accordingly, the tether 132 is shorter than the tether 32.

Figure 8:
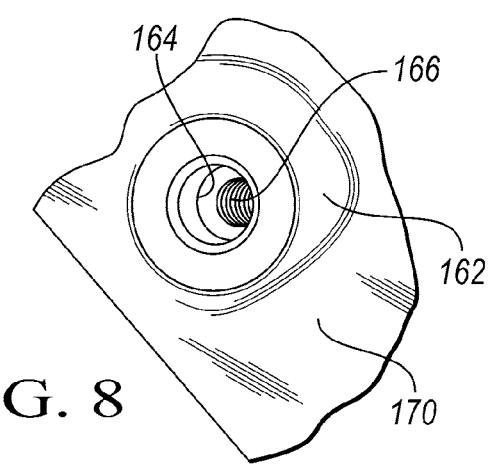
FIG. 8 is a schematic illustration in fragmentary perspective view of a lower control arm with a boss and an opening.

With reference to FIG. 8, the lower control arm 170 has a boss 162 and the second opening 164 is in the boss 162. In the embodiment shown, the lower control arm 170 is an Aluminum alloy that is cast, such as a forged casting, or is stamped steel. If the lower control arm 170 is cast, the boss 162 can be cast integrally with the lower control arm 170. The second opening 164 is drilled, and threads 166 are tapped in the boss 162. The opening 56A (indicated in FIG. 4) of the first lug 50 is aligned with the first opening 60 of the steering knuckle 23, and the opening 56B (indicated in FIG. 4) of the second lug 52 is aligned with the second opening 164 of the lower control arm 170. The bolt 54B extends through the opening 56B (indicated in FIG. 4) in the second lug 52 and into the second opening 164 of the lower control arm 170 to attach the tether 132 to the lower control arm 170 at the second opening 164.

The lower control arm 170 moves with the steering knuckle 23 relative to the engine cradle 17 as the steering knuckle 23 articulates up and down as the vehicle 10 is driven. Both the lower control arm 170 and the steering knuckle 23 articulate generally together relative to the engine cradle 17 and the body structure of the vehicle 10, such as the wheel well structure 26. There is thus less relative movement between the lugs 50, 52 of the tether 132 during standard driving conditions, i.e., when the barrier 14 is not engaged with the vehicle 10, than if the ends of the tether 132 were connected to components that do not articulate together. Accordingly, the relatively short cable portion 136 will restrict movement of the steering knuckle 23 and the other components of the tire and wheel assembly 19 in the wheel cavity 24 relative to the lower control arm 170 to a greater degree than a tether with a longer cable portion.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. An energy management system for a vehicle, wherein the vehicle has a wheel well structure defining a wheel cavity, and a tire and wheel assembly in the wheel cavity, the energy management system comprising:
   a tether attached to the tire and wheel assembly and configured to limit movement of the tire and wheel assembly within the wheel cavity under a predetermined load that is applied to the vehicle forward of the tire and wheel assembly and offset from a longitudinal centerline of the vehicle;
   wherein the tether includes a cable portion, a first end connector connected to a first end of the cable portion, and a second end connector connected to a second end of the cable portion; and
   wherein the first end connector has a first lug, and the second end connector has a second lug.

2. The energy management system of claim 1, wherein the tire and wheel assembly includes a wheel, and a steering knuckle operatively connected to the wheel; wherein the vehicle includes a lower control arm operatively connected to the steering knuckle; and wherein the tether is attached to the lower control arm and to the steering knuckle.

3. The energy management system of claim 2, wherein the steering knuckle has a first opening and the lower control arm has a boss with a second opening; and wherein the tether is operatively connected to the steering knuckle at the first opening and to the lower control arm at the second opening.

4. The energy management system of claim 3, wherein the lower control arm is one of a cast Aluminum alloy, an Aluminum alloy that is a forged casting, or a stamped steel.

5. The energy management system of claim 1, wherein the first lug is configured to align with the first opening, and the second lug is configured to align with the second opening.

6. The energy management system of claim 5, wherein the first and second openings are drilled tapped openings.

7. The energy management system of claim 1, wherein the tire and wheel assembly includes a wheel, and a steering knuckle operatively connected to the wheel; wherein the vehicle includes an engine cradle; and wherein the tether is attached to the engine cradle and to the steering knuckle.

8. The energy management system of claim 7, wherein the steering knuckle has a first opening and the engine cradle has a boss with a second opening; and wherein the tether is operatively connected to the steering knuckle at the first opening and is operatively connected to the engine cradle at the second opening.

9. The energy management system of claim 8, wherein the engine cradle is one of a cast Aluminum alloy, an Aluminum alloy that is a forged casting, or a stamped steel.

10. The energy management system of claim 1, wherein the vehicle includes a lower control arm at least partially in the wheel cavity; wherein the tire and wheel assembly includes a wheel, and a steering knuckle operatively connected to the wheel and to the lower control arm;
wherein the tether is operatively positioned in the wheel cavity and attached to the lower control arm and to the steering knuckle;
wherein the first end connector is crimped to the first end of the cable portion, and the second end connector is crimped to the second end of the cable portion; and
wherein the tether is connected to the steering knuckle at the first lug, and to the lower control arm at the second lug.

11. The energy management system of claim 10, wherein the steering knuckle has a first opening and the lower control arm has a boss with a second opening; and wherein the first lug is configured to align with the first opening, and the second lug is configured to align with the second opening.

12. The energy management system of claim 11, the lower control arm is one of a cast Aluminum alloy, an Aluminum alloy that is a forged casting, or a stamped steel.

13. A vehicle comprising:
a wheel well structure defining a wheel cavity;
a tire and wheel assembly in the wheel cavity; wherein the tire and wheel assembly includes a wheel, and a steering knuckle operatively connected to the wheel;
a lower control arm operatively connected to the steering wheel;
an energy management system including a tether attached to the tire and wheel assembly and configured to limit movement of the tire and wheel assembly in the wheel cavity under a load that is applied to the vehicle forward of the tire and wheel assembly and offset from a longitudinal centerline of the vehicle; and
wherein the tether is attached to the lower control arm and to the steering knuckle.

14. The vehicle of claim 13 comprising, wherein the steering knuckle has a first opening and the lower control arm has a boss with a second opening; and wherein the tether is operatively connected to the steering knuckle at the first opening and to the lower control arm at the second opening.

15. The vehicle of claim 14, wherein the first and second openings are drilled tapped openings.

16. The vehicle of claim 14, wherein the tether includes a cable portion, a first end connector connected to a first end of the cable portion, and a second end connector connected to a second end of the cable portion; and
wherein the first end connector has a first lug, and the second end connector has a second lug.

17. The vehicle of claim 13, wherein the lower control arm is one of a cast Aluminum alloy, an Aluminum alloy that is a forged casting, or a stamped steel.

18. A vehicle comprising:
a wheel well structure defining a wheel cavity;
a tire and wheel assembly in the wheel cavity;
wherein the tire and wheel assembly includes a wheel, and a steering knuckle operatively connected to the wheel;
an engine cradle;
an energy management system including a tether attached to the tire and wheel assembly and configured to limit movement of the tire and wheel assembly in the wheel cavity under a load that is applied to the vehicle forward of the tire and wheel assembly and offset from a longitudinal centerline of the vehicle; and
wherein the tether is attached to the engine cradle and to the steering knuckle.

19. The vehicle of claim 18, wherein the steering knuckle has a first opening and the engine cradle has a boss with a second opening; and wherein the tether is operatively connected to the steering knuckle at the first opening and to the engine cradle at the second opening.

20. The vehicle of claim 18, wherein the engine cradle is one of a cast Aluminum alloy, an Aluminum alloy that is a forged casting, or a stamped steel.

* * * * *